United States Patent
Brocke et al.

(10) Patent No.: US 11,165,236 B2
(45) Date of Patent: Nov. 2, 2021

(54) SUPPRESSING CIRCULATING CURRENTS IN CONDUCTIVE STRUCTURES IN BUILDINGS

(71) Applicant: DEHN SE + CO KG, Neumarkt/Opf. (DE)

(72) Inventors: Ralph Brocke, Ilmenau/Oberpörlitz (DE); Ottmar Beierl, Aurachtal (DE)

(73) Assignee: DEHN SE + CO KG, Neumarkt/Opf. (DE)

( * ) Notice: Subject to any disclaimer, the term of this patent is extended or adjusted under 35 U.S.C. 154(b) by 44 days.

(21) Appl. No.: 16/647,989

(22) PCT Filed: Dec. 12, 2017

(86) PCT No.: PCT/EP2017/082349
§ 371 (c)(1),
(2) Date: Mar. 17, 2020

(87) PCT Pub. No.: WO2019/057319
PCT Pub. Date: Mar. 28, 2019

(65) Prior Publication Data
US 2020/0220344 A1    Jul. 9, 2020

(30) Foreign Application Priority Data

Sep. 19, 2017  (DE) .......................... 10 2017 121 656.1
Dec. 5, 2017   (DE) .......................... 10 2017 128 905.4

(51) Int. Cl.
*H02G 13/00*    (2006.01)
(52) U.S. Cl.
CPC ............. *H02G 13/80* (2013.01); *H02G 13/60* (2013.01)
(58) Field of Classification Search
CPC .................................................... H02G 13/80
(Continued)

(56) References Cited

U.S. PATENT DOCUMENTS

| | | | |
|---|---|---|---|
| 3,009,982 A | 11/1961 | Newman | 174/2 |
| 2003/0033755 A1* | 2/2003 | Lord | E04H 1/1205 52/3 |
| 2019/0210902 A1* | 7/2019 | Sassow | C05F 17/50 |
| 2021/0135446 A1* | 5/2021 | Matsumoto | H02G 13/80 |

FOREIGN PATENT DOCUMENTS

| | | | |
|---|---|---|---|
| CN | 201004353 Y | | 1/2008 |
| CN | 101133538 | * | 2/2008 |
| CN | 101133538 A | | 2/2008 |
| CN | 101513133 | * | 8/2009 |
| CN | 101513133 A | | 8/2009 |

(Continued)

OTHER PUBLICATIONS

Office Action (in Chinese), dated Jan. 5, 2021, issued by the China National Intellectual Property Administration for Applicant's related Chinese Patent Application No. CN201780096873.9, filed Dec. 12, 2017.

(Continued)

*Primary Examiner* — Stanley Tso
(74) *Attorney, Agent, or Firm* — Bodner & O'Rourke, LLP; Gerald T. Bodner; Christian P. Bodner

(57) ABSTRACT

The invention relates to a method for designing a lightning protection system for the exterior lightning protection of buildings and systems and to an insulated lightning arrester device related thereto. The lightning arrester of the lightning protection system is at least partly designed as an insulated electric conductor with a conductive layer or casing on the insulation, and conductive structures can be found in the respective building or the respective system, wherein the structures are potentially exposed to inductions which occur in the event of a lightning current to be arrested, and correspondingly the conductive layer on the insulated conductor together with the respective conductive structure forms a secondary loop.

4 Claims, 2 Drawing Sheets

Figure 1:
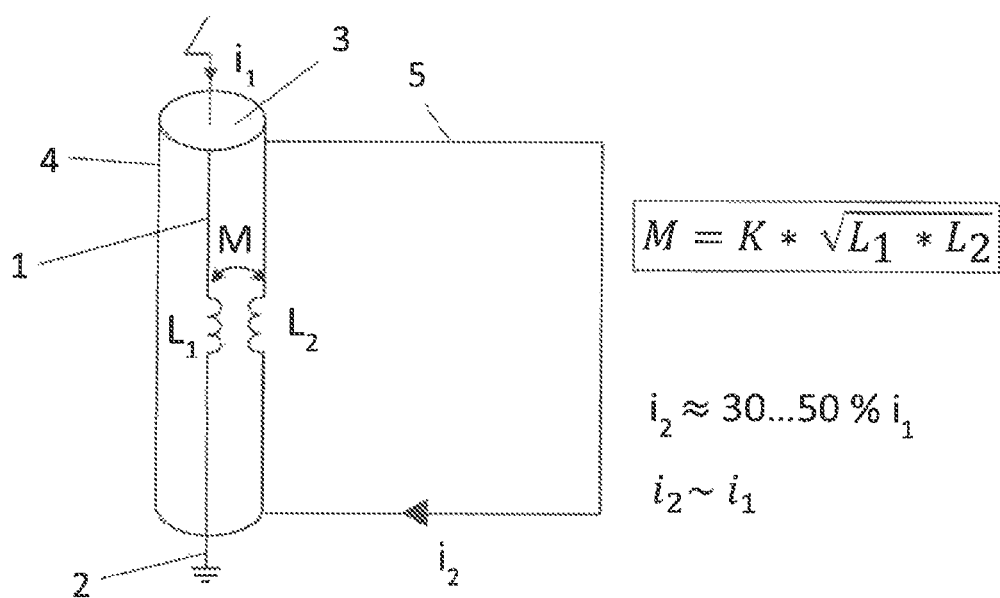

(58) Field of Classification Search
USPC .......................................................... 174/200
See application file for complete search history.

(56) References Cited

FOREIGN PATENT DOCUMENTS

| DE | 10228665 | A1 |   | 5/2003 |
|----|----------|----|---|--------|
| DE | 10233528 | A1 |   | 2/2004 |
| DE | 10228665 | B4 |   | 6/2004 |
| DE | 10233528 |    | * | 2/2005 |
| DE | 10233528 | B4 |   | 1/2008 |
| DE | 102009056291 | A1 |   | 6/2011 |
| FR | 2800211  | A1 |   | 4/2001 |

OTHER PUBLICATIONS

The Notification Concerning Transmittal of International Preliminary Report on Patentability (Chapter I of the Patent Cooperation Treaty), in English, dated Apr. 2, 2020, which was issued by the International Bureau of WIPO in Applicant's corresponding international PCT application having Serial No. PCT/EP2017/082349, filed on Dec. 12, 2017.

The English translation of the International Preliminary Report on Patentability (Chapter I of the Patent Cooperation Treaty), dated Mar. 24, 2020, which was issued by the International Bureau of WIPO in Applicant's corresponding international PCT application having Serial No. PCT/EP2017/082349, filed on Dec. 12, 2017.

The Written Opinion of the International Searching Authority, in English, dated Jun. 4, 2018, which was issued by the International Bureau of WIPO in Applicant's corresponding international PCT application having Serial No. PCT/EP2017/082349, filed on Dec. 12, 2017.

The International Search Report, in English, dated Jun. 4, 2018, which was issued by the International Bureau of WIPO in Applicant's corresponding international PCT application having Serial No. PCT/EP2017/082349, filed on Dec. 12, 2017.

\* cited by examiner

SUPPRESSING CIRCULATING CURRENTS IN CONDUCTIVE STRUCTURES IN BUILDINGS

The invention relates to a method for designing lightning protection systems for the exterior lightning protection of buildings and installations, wherein the lightning arresting device of the lightning protection system is at least partly designed as an insulated electrical conductor with a conductive layer or casing on the insulation, and conductive structures are located in the respective building or the respective installation, wherein the structures are potentially exposed to an induction occurring in the event of a lightning current to be arrested, and correspondingly the conductive layer on the insulated arresting device together with the respective structure forms a secondary loop.

From DE 102 28 665 B4, a lightning current arresting device for electrically connecting an arresting device to an earthing system in the exterior lightning protection is already known.

According to the teaching therein, an electrical conductor is used for the lightning current arresting device, which conductor is embedded in an insulating casing which in turn has a conductive sheathing.

In the connection section of the electrical conductor with the arresting device, for example, a lightning arresting rod, an arrangement for field control is provided to prevent floating discharges and to increase the pulsed voltage capacity.

The already known teaching solves the task to configure the arresting system such that the safety distance to other conductive installation parts that have to be protected can be reduced. Furthermore, apart from a high surge current carrying capacity, the lightning current arresting device should have sufficient strength against floating discharges.

According to the cited state of the art, the field control is formed to be capacitive or as ohmic field control of the cable end.

As a control medium in this respect, semiconducting substances or semiconducting strips that can be wound up are used. Due to the use of the lightning current arresting device according to DE 102 28 665 B4 in conjunction with an insulated arresting line, the separation distance relative to an approximation area between a cable duct situated, for example, inside of the building, can be kept.

The further development of DE 102 28 665 B4 according to DE 102 33 528 B4 intends to ensure that transformational couplings of the lightning current to be arrested can be reduced to an acceptable level in a shielding conductor.

It has been shown that the fundamental option to solve the approximation problematics in lightning current arresting devices in that lightning current arresting devices hitherto not insulated are surrounded by an insulating coating, is impeded by problems in the transition of the insulated arresting line to the lightning protection installation itself. Thus, floating discharges occur at the point of introducing the lightning current into the line along the surface. Once the floating discharge inception voltage and the relevant field strength are exceeded, stable discharges are generated reducing the dielectric strength as a whole and initiating a flashover so that the actual insulation becomes ineffective. If shielded coaxial cables of high dielectric strength to prevent floating flashovers are provided with resistance-controlled cable terminations and are used for the purpose of lightning protection, undesired transformational couplings of the primary lightning current to be arrested will occur in the shielded conductor due to the shielded conductors.

This is problematic since the conductive conductor usually is integrated in the system of metallic components or structures of the building. In case of small loop resistances having values of less than 1 Ohm, considerable currents will occur which may amount up to 50% of the primary lightning current to be arrested.

This negative effect constitutes a considerable danger for the electric or electronic installations and devices installed in the building. This danger can only be avoided by a complex shielding or larger distances between the insulated arresting system and the remaining metallic components which are difficult to realize. In order to reduce transformational couplings of the lightning current to be arrested into the shielded conductor, the insulation casing of the lightning current arresting devices is proposed to be provided with a conductive sheathing having a stepped resistance over its length. In the connection section of the electrical conductor with the arresting device, an arrangement for field control known per se is in turn provided for the purpose of preventing floating discharges.

The lightning current arresting device according to DE 102 33 528 B4 thus is composed of a coaxial arrangement having an internal conductor capable of carrying lightning currents, a corresponding insulation, and a resistance-variable conductive casing and an external mechanical protective sheath.

The conductive sheathing has a resistance of about 100 kOhm/m with respect to a first section. Subsequent further sections have a resistance value of preferably between 100 kOhm/m and 1 MOhm/m.

Preferably, the resistance values from 100 kOhm/m to 1 MOhm/m are rising in a stepped manner, with between two and twenty increments being provided.

Summarizing, lightning protection systems having insulated lightning current arresting devices have the task to ensure, apart from the reliable arresting of lightning currents, that partial lightning currents will not flow in the building to be protected or the installation to be protected.

In this respect, the lightning protection system consequently needs to be realized separately from the conductive structure in the building to be protected or the installation to be protected.

Furthermore, it must be ensured that the current which might be generated due to the induction effect in a conductor loop composed of the arresting line through which lightning current flows and the conductive structure in the building, can be limited to uncritical values.

This is achieved according to the known state of the art by maintaining a sufficient separation distance in air or by providing suitable insulation materials, for example, on the basis of glass fiber reinforced rods guaranteeing the corresponding insulation capacity.

As already stated, lightning protection systems may be realized with insulated arresting lines, with the option being here to reduce the separation distances. A challenge in this respect is the domination of the above-mentioned floating flashovers along the surface of the insulated arresting line, with a control of the electrical potential along the surface of the arrester being necessary in this respect for dominating these floating flashovers.

If the insulated arresting line is provided with a conductive layer as known from the state of the art, floating flashovers can be reliably dominated.

This conductive layer on the insulated arresting line together with the conductive structure inside the building to be protected, however, forms a secondary loop. This secondary loop is penetrated by the magnetic field of the lightning current flowing in the insulated arresting line. During this, very high loop voltages in the range of several 100 kV are induced.

These arising high currents in the conductive structure in the building, object or installation to be respectively protected may result in considerable damages or the impairment of the functional capacity of corresponding installations. In the existing design of corresponding lightning protection systems, the separation distance either was enlarged as a precaution, which, however, entails disadvantages in erecting the installation as well as in the negative architectural effect often resulting. In the majority of all installation cases, however, only little attention was paid to these critical loads in the secondary loops.

Furthermore, a contradiction to be resolved consists of the following.

Basically, the insulated arresting line could be encased with a layer of a lowest possible impedance in order to minimize the mentioned floating flashover risk, since in case of a low-impedance encasing, the arising voltage load is distributed evenly and independently of external influences along the entire arresting line.

On the other hand, due to the low impedance of the secondary loop, a circulating current is generated in the secondary loop, the magnitude of which is comparable to the partial lightning currents which actually should be avoided. In the case of low impedance, the pulse shape of the induced circulating current in the secondary loop is proportional to the temporal course of the lightning current to be arrested. The risk potential thus is identical to that of the partial lightning current to be avoided.

If, on the other hand, the outer casing is realized to be of high impedance, as proposed, for instance, in the state of the art according to DE 102 33 528 B4, the risk of floating flashover remains high, since the arising voltage load is distributed unevenly, following the external influences with respect to a capacitive coupling to the building structure along the entire arresting line.

It is true that due to the then arising high impedance of the secondary loop, only a minimum circulating current is generated, the magnitude of which is lower, and which, in its temporal course, follows mathematically to the first derivation of the lightning current to be arrested in the insulated arresting line, and which is in this respect not comparable to the partial lightning currents that should be avoided. However, in the case of high impedances, special measures for field control need to be taken, which are depicted in the state of the art mentioned at the beginning.

From the aforementioned, it is therefore a task of the invention to propose a method and an insulated arresting device for designing lightning protection systems for the exterior lightning protection in buildings and installations, which, on the one hand, reduces the risk of inadmissible currents in arising secondary loops, and wherein, on the other hand, it is ensured, that even at prolonged operation of corresponding lightning protection systems under all resulting environmental and other influences, floating discharges along or on the insulated arresting line are avoidable.

The solution of the task of the invention is achieved according to the teaching of claim 1 as far as the method is concerned, and with respect to the insulated lightning current arresting device according to the features of the claims.

The invention solves the problem depicted at the beginning in that great loop currents in the secondary loop are avoided by introducing or inserting high-voltage resistant segments of low conductivity in the loop path for limiting the loop current.

In addition, these segments of low conductivity are dimensioned and designed such that floating flashovers are reliably prevented.

The design of the segments is performed in a manner that the resulting loop current is no longer proportional to the lightning current progress but follows the first temporal derivation of the lightning current in good approximation.

By means of the solution according to the invention, the floating flashover risk is minimized and the energetic load of all of the components situated within the secondary loop is minimized. A further dimensioning criterion in designing the segments is to minimize the energetic load thereof.

In the method according to the invention for designing lightning protection systems for the exterior lightning protection of building, objects and/or installations, the employed lightning current arresting device is at least partly designed as an insulated electrical conductor with a conductive layer or casing on the insulation, and conductive structures van be found in the respective building or the respective installation to be protected, which are potentially exposed to inductions which occur in the event of a lightning current to be arrested, wherein correspondingly the conductive layer on the insulated arresting device together with the respective conductive structure forms a secondary loop. In accordance with the method according to the invention, an analysis of the spatial position of the conductive structures in the building or the respective installation to be protected and the determination of potential secondary loops are performed.

This determination can be made using existing documents on the respective building or installation, but also in conjunction with an inspection on site. If, for example, a building is not yet completely equipped with the installations or devices to be used later, the above-mentioned determination can be performed with consideration of the metallic components existing in or on the building, wherein in the further design of the lightning protection system, a minimization of secondary loop currents is basically intended also while considering the electromagnetic compatibility, in order to be able to use the respective building also for installing and utilizing highly sensitive electronic and electrotechnical systems.

In the practical implementation of the method according to the invention, reference can be made in terms of certain industrial warehouses or industrial buildings to memorized empirical values or constructional specifications.

In a following step, critical distances of the planned insulated arresting device of the lightning protection system to be installed are determined, and the induction effect in the respective secondary loop(s) is evaluated from standard lightning current surge current variables for the range of the critical distances which cannot be varied by increasing the separation distance, while considering the entire length of the insulated arresting device and the total displacement current resulting therefrom.

Following this, the evaluated potential maximum circulating current caused by induction in the respectively observed secondary loop is compared to an acceptable threshold value. The corresponding threshold values may be determined in advance in the scope of examinations in high-voltage test laboratories in conjunction with known simulation methods as standard threshold values.

Subsequently, the insulated arresting line is modified if an excess of the threshold value is to be expected, in that at least in longitudinal sections, the resistance value of the conductive layer applied to the insulation of the arresting line is specifically increased, wherein the upper limit of the resistance increase is predefined by the floating discharge operating field strength in the respective section that had been modified in its resistance value.

The above-mentioned modification of the insulated arresting line if the threshold value is expected to be exceeded, is also to be understood such that, from a stored quantity of realized insulated arresting lines having certain properties with respect to the resistance value of the casing, that arresting line is selected which proves to be optimum for the corresponding case of application.

Alternatively, there is the possibility to assemble individually on site or prior to the delivery of the arresting line, relative to the case of application, the insulated arresting line from a plurality of arresting line sections having different resistance values.

In a further development of the invention, the conductive layer of the insulated arresting line is formed to have high impedance over its entire length, wherein the resistance value is in the range between 0.5 to 10 kOhm/m or does not exceed this value.

In a further development of the invention, the conductive layer or casing of the insulated arresting line is interrupted at least in longitudinal sections by a high-voltage resistant segment that is free from floating discharges.

There is likewise the possibility to provide the conductive layer or casing of the insulated arresting line at one or more longitudinal sections with embedded, high-voltage resistant resistance areas that are free from floating discharges.

Furthermore, according to the invention, there is the insulated arresting device formed according to the invention for the exterior lightning protection.

Apart from the presented method, the invention also consists of a lightning current arresting device for the exterior lightning protection having an electrical conductor embedded in an insulation casing, wherein the insulation casing is provided with a conductive sheathing. The conductive sheathing has in this respect at least one resistance value increased at least in longitudinal sections, wherein the lower range of the resistance value limits circulating currents in electrical secondary loops of building, objects or installations to uncritical peak values in case of assumed lightning currents, and during this, the upper range of the resistance value reliably avoids floating discharge operating field strengths to be reached or exceeded.

In this respect, the increased resistance value is below 100 kOhm/m.

Preferably, the increased resistance value is in the range of substantially 0.5 kOhm/m to 1 kOhm/m.

In a further development of the invention, the increased resistance value is rated such that the current i2 in the respective secondary loop is 0.1 to 1% of the current i1 flowing in the primary loop, i.e. in the event of lightning current, through the arresting device.

The invention will be explained below in more detail on the basis of an exemplary embodiment and with reference to Figures.

Figure 2:
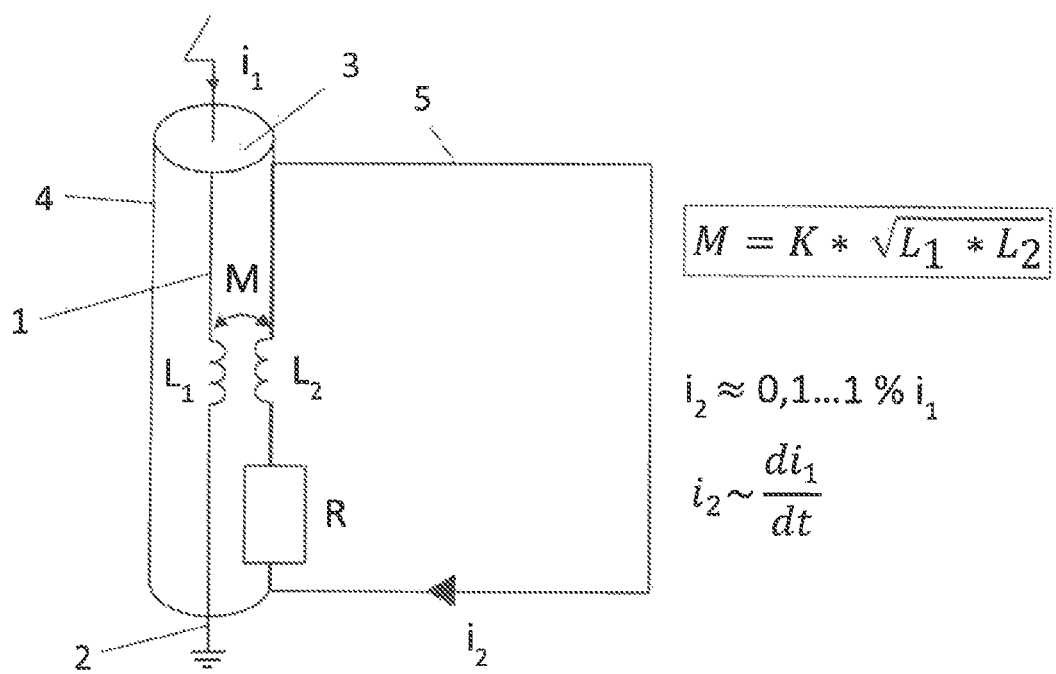

Shown are in:

FIG. 1 a principle representation of the induction effect in a secondary loop of a conductive structure in the building to be protected, and a usual low-impedance sheathing of an insulated arresting line according to the state of the art; and FIG. 2 the effect of a limitation according to the invention of the induced current in the secondary loop by using a high-voltage resistant resistor R rated according to the invention that is free from floating discharges.

The circulating current i2 induced into the secondary loop is determined by the influencing variables amplitude and temporal progress of the lightning current to be arrested, the geometry of the secondary loop, and the resistance of the areas or segments of the conductive sheathing that had been modified according to the invention.

The risk of a floating flashover on the surface of insulated arresting lines is likewise defined by the amplitude and the temporal progress of the lightning current to be arrested and the resistance of the segments to be dimensioned, but also by external influences along the arresting line, in particular also by conductive components situated in the proximity.

Since the amplitude, the temporal progress of the lightning current, the geometry of the secondary loop, but also the external influences along an arresting line cannot be influenced or only to a certain extent, and insulated arresting lines per se should be universally applicable, the design and rating of resistance values is taken as a basis according to the invention for solving the assigned task, which resistance values apply with respect to the insulated arresting line at least in longitudinal sections in the area of the external conductive sheathing.

An exemplary rating of the resistor surface or the formation of the corresponding longitudinal section will be explained below.

It is known from a multitude of examinations and measurements that in a lightning current relevant voltage change velocity of $du/dt=3$ MV/µs on an insulated arresting line with a capacitance coating of $C=100$ pF/m per meter of running length, a capacitive displacement current of about 300 S becomes effective.

When the entire length of the insulated arresting line is assumed to be 10 m, for example, and with an assumed linearly decreasing voltage distribution along the internal conductor of the insulated arresting line, an entire displacement current of 1500 A will be the result.

If a floating discharge field strength of, for example, $E_{GE}=20$ kV/cm is assumed, the resistance of the insulated arresting line in the relevant section or over the entire length will amount to about 1.33 kOhm/m as the maximum value which should not be exceeded if possible.

In such an exemplary design, a circulating current in the secondary loop having a peak value of about 180 A and a pulse duration of 250 ns is the result in case of an assumed lightning current of lightning protection class I (negative following flash at 200 kA/µs and a coupling inductance of 1.2 pH/m underlying the standard).

By means of the representation according to FIG. 1, an exemplary section of a lightning protection system for the exterior lightning protection is shown, wherein a lightning current arresting device is provided, which in case of a lightning strike discharges the lightning current i1 via an electrical conductor 1 to an earth electrode 2.

Depending on the embodiment of the correspondingly equipped lightning protection system, the primary loop has an inductance $L_1$.

The employed insulated lightning protection arresting device has a conductive layer or casing 4 on the insulation 3.

This conductive layer together with a conductive structure 5 in the building to be protected (not shown) form a secondary loop. This secondary loop has the inductance $L_2$. Depending on the spatial allocation, a magnetic coupling M is the result.

Without the measures according to the invention, the current i2 induced into the secondary loop may be between 30 and 50% or more of the current i1, with the consequence of negative effects upon the conductive structure itself or electronic or electrotechnical components situated on or in the proximity of this structure.

A limitation of the current i2 induced into the secondary loop is performed with reference to a solution as symbolically represented in FIG. 2.

In this respect, a targeted increase of the resistance value R of the conductive layer 4 applied to the insulation of the arresting line realized at least in longitudinal sections is performed.

The upper limit of the resistance increase is predefined by the floating discharge operating field strength in the respective section modified in its resistance value.

In the design according to the invention of the corresponding lightning protection arresting device, the circulating current i2 in the secondary loop amounts to about 0.1 to 1% of the current i1.

The current i2 approximately results from di1/dt.

The invention claimed is:

1. A method for designing lightning protection systems for exterior lightning protection of buildings and installations,
   wherein an insulated lightning arresting line of a lightning protection system of the lightning protection systems is at least partly designed as an insulated electrical conductor with a conductive layer or casing of the insulated lightning arresting line,
   and conductive structures are located in a respective building or a respective installation,
   wherein the conductive structures are potentially exposed to an induction occurring in an event of a lightning current to be arrested,
   and correspondingly the conductive layer on the insulated lightning arresting line together with the respective conductive structure forms a secondary loop,
   including the following steps:
      analyzing a spatial position of the conductive structures in the building or the respective installation to be protected and determination of potential secondary loops;
      determining critical distances of the insulated lightning arresting line,
      and estimating an induction effect in the secondary loop from standard lightning surge current variables for a range of the critical distances which cannot be varied by increasing a separation distance, while considering a total length of the insulated lightning arresting line and a total displacement current resulting therefrom;
      comparing an evaluated potential maximum circulating current caused by induction in the secondary loop to an acceptable threshold value;
      modifying the insulated lightning arresting line if an excess of a threshold value is to be expected, by specifically increasing at least in longitudinal sections, a resistance value of the conductive layer or casing applied to the insulation of the insulated lightning arresting line,
   wherein an upper limit of the resistance increase is predefined by a floating discharge operating field strength in a respective section that had been modified in its resistance value;
   characterized in that the conductive layer of the insulated lightning arresting line is of high impedance over its entire operating length, however, a value of 10 kOhm/m is not exceeded; and
   characterized in that the increased resistance value is rated such that the current i2 in the respective secondary loop is 0.1 to 1% of the current i1 flowing in the primary loop, i.e. in the event of lightning current, through the arresting device.

2. The method according to claim 1,
   characterized in that
   the conductive layer or casing of the insulated arresting line is interrupted at least in longitudinal sections by a high-voltage resistant resistance segment that is free from floating discharges.

3. The method according to claim 1,
   characterized in that
   the conductive layer or casing of the insulated arresting line has at one or more longitudinal sections embedded, high-voltage resistant resistance areas that are free from floating discharges.

4. An insulated lightning current arresting device for the exterior lightning protection of buildings, objects and/or installations designed according to claim 1.

* * * * *